W. A. FRYE, F. H. CHINN & R. F. BURNETT.
RESILIENT TIRE.
APPLICATION FILED APR. 13, 1916.

1,243,503.

Patented Oct. 16, 1917.
2 SHEETS—SHEET 1.

Inventors
W. A. Frye, F. H. Chinn
and R. F. Burnett,
By Lancaster and Allwine
Their Attorneys

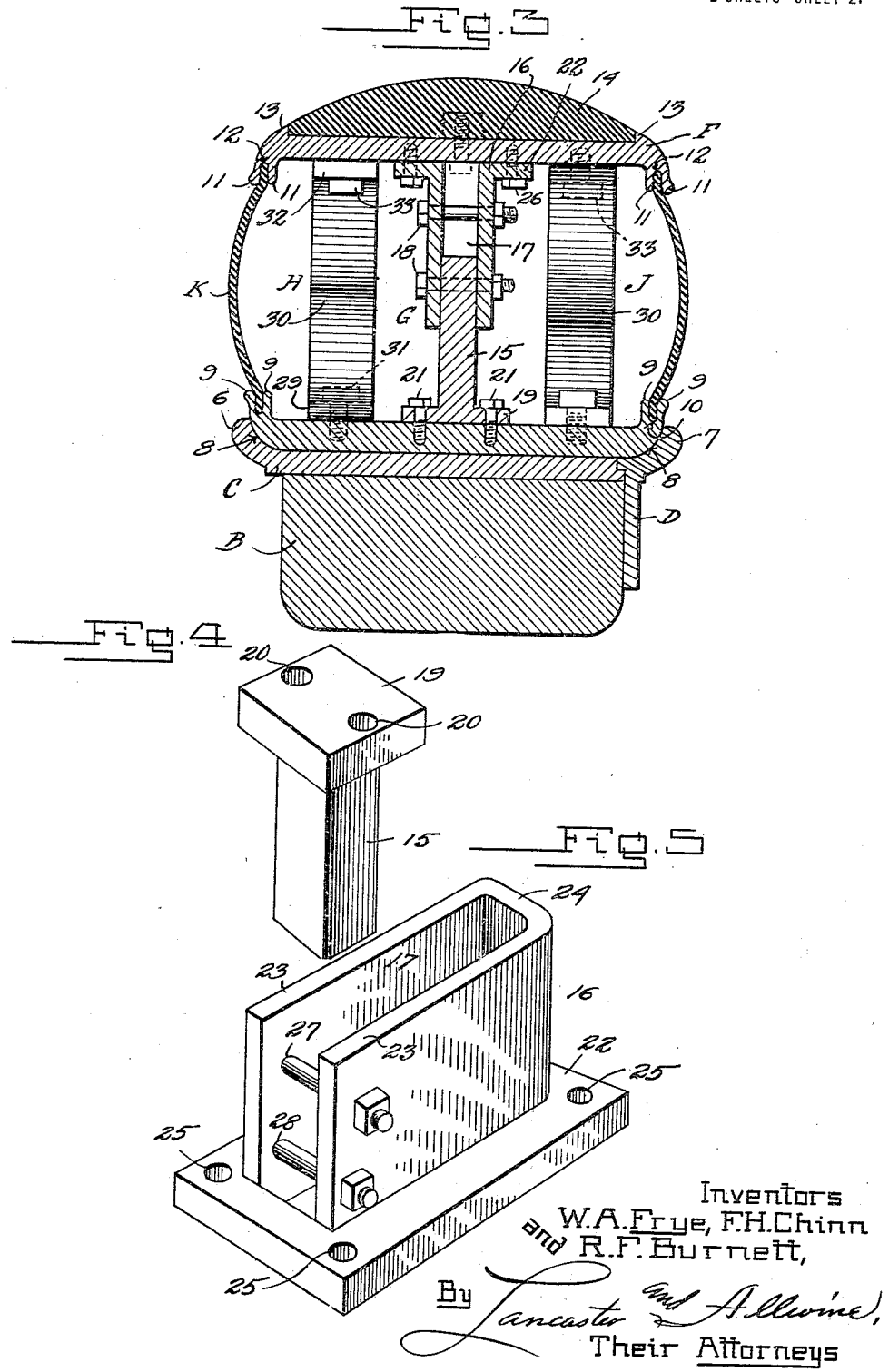

UNITED STATES PATENT OFFICE.

WILLIAM A. FRYE, FORREST H. CHINN, AND RICHARD F. BURNETT, OF COFFEYVILLE, KANSAS, ASSIGNORS OF ONE-FOURTH TO NEIL A. COOK, OF COFFEYVILLE, KANSAS.

RESILIENT TIRE.

1,243,503. Specification of Letters Patent. Patented Oct. 16, 1917.

Application filed April 13, 1916. Serial No. 90,896.

*To all whom it may concern:*

Be it known that we, WILLIAM A. FRYE, FORREST H. CHINN, and RICHARD F. BURNETT, residents of Coffeyville, in the county of Montgomery and State of Kansas, have invented a new and useful Improvement in Resilient Tires, of which the following is a specification.

Our present invention relates to resilient tires for use on vehicle wheels, and embodies springs in contradistinction to tires of the pneumatic type, in order to give resiliency to the structure.

The principal objects of our invention are to provide resilient tires which are durable and inexpensive to manufacture and maintain in good repair; resilient tires utilizing springs of substantially S-shape so positioned that the tread portion of the tire will remain centered with respect to the wheel felly, during ordinary usage; and, to provide resilient tires embodying means to prevent lateral displacement of the tread portion with respect to the main body portion of the wheel, when the structure is subjected to unusual shocks, yet in no way impairing the resiliency thereof.

A further object of our invention is to provide a resilient tire embodying two bands which are normally held concentric one with the other by said springs, but which may move to eccentric relation, when under load, and including means for holding said bands against lateral displacement, said means being so constructed that assemblage is facilitated.

Other objects of our invention will appear in the following detailed description, taken in connection with the accompanying drawings, forming a part of this specification, and in which drawings:

Fig. 3 is a sectional view on the line 3—3 of Fig. 1.

Fig. 4 is a perspective view of a lug forming a part of means for preventing lateral displacement of the tread portion of the tire with respect to the central plane of the wheel.

Fig. 5 is a perspective view of a member coöperating with the lugs shown in Fig. 4.

Figure 1:
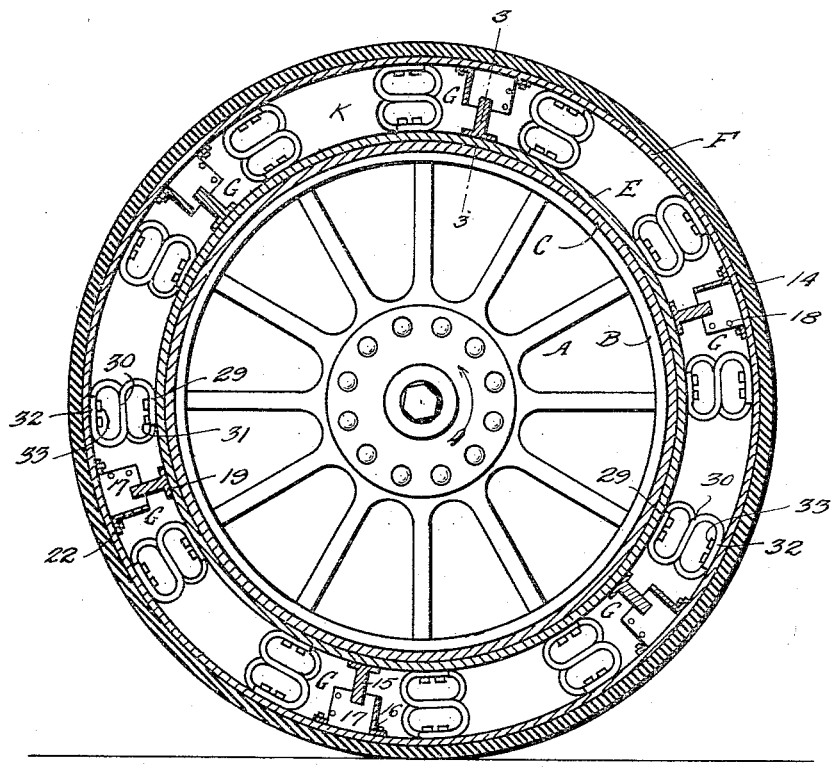
Figure 1 is a side elevation of a vehicle wheel, equipped with a tire constructed according to our invention, the parts of the tire, with the exception of the springs, being shown in section.
Figure 2:
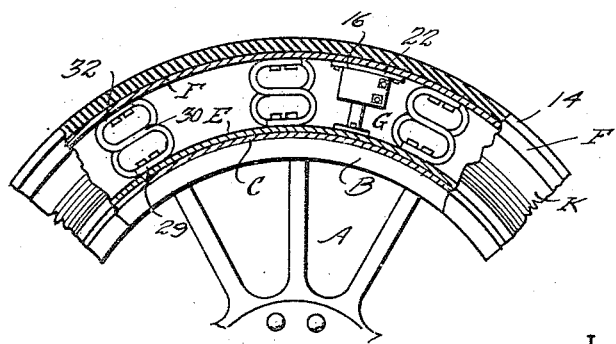
Fig. 2 is a fragmentary elevation of a portion of said wheel, parts being broken away to disclose details.

In the drawings, where similar characters refer to similar parts throughout the several views, A designates a wheel including a felly B; C a permanent rim carried by said felly; D a ring coöperating therewith; E an inner band fitting said rim C and held in place by ring D; F an outer band; G means for preventing lateral displacement of band E with respect to band F; H and J two sets of S-shaped springs secured intermediate bands E and F, one set of springs at each side of the central plane of the wheel A; and, K two yieldable annuli fitting between the adjacent end portion of bands E and F, to protect the elements inclosed from the destructive action of granular material and moisture.

In the present example, the invention is shown applied to a wheel of the demountable type, such as that provided with a rim C having a flange 6, and a detachable ring D having a flange 7, the tire structure to fit between said flanges 6 and 7.

Referring first to the band E, its internal diameter is such as to fit nicely about the periphery of rim C, and may be rounded as at 8 so as to fit closely against the flanges 6 and 7, as clearly shown in Fig. 3 of the drawing. For a purpose to be subsequently set forth it is provided with two flanges 9 at each edge, said flanges projecting toward the outer band F, and forming a groove 10.

As to the outer band F, it is similarly provided with flanges 11 which project toward the band E, and provide a groove 12. At its outer surface, it is provided with marginal flanges 13 designed to hold in place an annular tread member 14, made up of a composition including rubber, or other suitable resilient material.

In order to prevent lateral displacement of the outer band F with respect to the inner band E, the means G is provided, and includes a plurality of lugs 15 carried by one of the bands and extending toward the other band; a member 16 for each lug 15 so formed as to provide a way 17 into which said lug projects; and, detachable stops such as bolts 18 to limit the circumferential movement of the outer band with respect to the inner band. In the example shown, the lug 15 is provided with a base plate 19, having apertures 20 through which bolts 21, having screw-threaded engagement with the band E, extend. The member 16 comprises a base plate 22, parallel spaced circumferentially extending wall portions 23, and end wall portion 24. The base 22 is provided with apertures 25 through which extend bolts 26, having screw-threaded engagement with the outer band F, while the parallel wall portions 23 are provided with alined apertures 27, and alined apertures 28, at their ends opposite from wall portion 24, the removable stops 18 extending through said apertures 27 and 28, as is clearly shown in Fig. 5 of the drawing. In the example shown, the stops 18 comprise nuts and bolts, which are readily detachable.

When assembling the outer band into operative relation to the inner band, the former is moved so that the lugs 15 are circumferentially alined with ways 17, the stops 18 having first been removed. The outer band F is then partially rotated so that the lugs 15 move toward the end walls 24, and until said lugs engage the inner surfaces of wall portions 23. It is to be observed that the lugs 15 extend toward the bands opposite to which they are secured, but are spaced therefrom, and after having been placed within their respective ways 17, the stops 18 are positioned as shown in Fig. 3 of the drawing, limiting the amplitude of oscillation of the outer band with respect to the inner band.

Referring now to the sets of springs H and J, which are positioned so that there is one set at each side of the center plane of the bands, it is to be observed that the end portions 29 of each spring of set H, which extends from the central body portion 30 are disposed in the same direction, with respect to the inner band E, while the said end portions 29 of the set of springs J, extend in a counter-direction with respect to said inner band. Thus, as the wheel is moving in one direction by a force imparted to the wheel hub, the springs of one set, and more particularly at their central body portions, are under compression, while the said central portions of the springs of the other set are subjected to an expansive force. However, assuming that the brakes are applied to the hub section of the wheel, these forces are reversed, and in the change from compression to expansion, or vice versa, there is less danger of the springs giving way under load. The end portions 29 of the springs are secured to the inner band, as by bolts 31, while the other end portions 32 are detachably secured to the outer band F, as by bolts 33. In assemblage, it is understood, the sets of springs are made secured to either the inner or outer band before the operation of bringing the lugs 15 within the ways 17, is carried out.

In order to protect the springs and means G from the destructive action of granular material or moisture, an annulus K of yieldable material, such as rubber or leather, is provided at each marginal portion of the bands E and F, the annulus fitting with its inner margins between flanges 9 of the band E, and with its outer margins fitting between the flanges 11 of band F. The distance of each annulus, from the inner margin to the outer margin is greater than the distance between the bands E and F, when the latter are in concentric relation, so that the annulus bulges out slightly laterally of the tire structure, as is clearly shown in Fig. 3.

In operation, when weight is brought upon the hub of wheel A, the inner band E is moved downwardly, throwing it eccentrically with respect to outer band F, and the lowermost springs of sets H and J are brought under compression. Assuming that movement is imparted to the wheel A in the direction indicated by the arrow, the central portions 30 of the springs of set J are brought under compression, while the said portions of the springs forming set H are expanded, and the lugs 15 move slightly within the ways 17. Should the force be applied suddenly to the hub of wheel A, lugs 15 would engage the end wall portions 24 preventing injury to the springs. On the other hand, if the brake should be suddenly applied, the lugs 15 would move toward and engage the stops 18, also preventing injury to the springs.

It is to be observed that, in Fig. 5, we have shown the stops 18 nearest the open end of way 17, into which the lug 15 extends, positioned nearest the wall 24, so that there will be no danger of the end portion of said lug engaging the other stop if an excessive weight is brought upon the hub of wheel A.

From the foregoing it is made manifest that we have provided a resilient tire which is inexpensive to manufacture, and may be maintained in good repair for a considerable length of time, the elements providing the desired resiliency being protected from inclement weather. Assemblage is also facilitated due to the construction and manner in which the means G operate. The tire may also be applied to existing wheels provided with demountable rims, and may serve efficiently, dispensing with the pneumatic tire now in common use.

Changes in details may be made without departing from the spirit or scope of our invention; but,

We claim:

1. In a resilient tire, the combination of inner and outer bands, means for resiliently connecting the bands, a peripheral row of anchoring members secured to one band and having circumferential ways therein opening in one direction only, radially extending lugs carried on the other band adapted to be engaged in said ways upon the turning of one band relatively to the other band, and securing devices detachably connected to said anchoring members across the open ends of the ways to limit the relative turning and lateral displacement of the bands.

2. A resilient tire comprising in combination, an inner and an outer band, pairs of reversely curved springs interposed between and detachably secured to said bands, normally retaining them in concentric relation and resisting circumferential relative turning of the bands in opposite directions, a plurality of lugs carried by one of said bands between adjacent pairs of springs and extending toward but spaced from the other band, a member for each of said lugs carried by the other band between said pairs of springs, each member formed to provide a circumferentially extending way closed at one end and into which its coöperating lug extends and engages the lateral walls to hold the bands from lateral displacement, the open ends of said ways extending in the same direction, and detachable devices for closing the ends of the said ways of said members to limit the circumferential flexing of the springs.

WILLIAM A. FRYE.
FORREST H. CHINN.
RICHARD F. BURNETT.

Witnesses:
N. A. COOKE,
R. V. NELSON.

Copies of this patent may be obtained for five cents each, by addressing the "Commissioner of Patents, Washington, D. C."